Dec. 1, 1959 V. A. ORLANDO 2,914,863
GYROSCOPICALLY STABILIZED COMPASS SYSTEM
Filed April 26, 1956

Inventor:
Vincent A. Orlando
by James E. Mrose
His Attorney

United States Patent Office 2,914,863
Patented Dec. 1, 1959

2,914,863

GYROSCOPICALLY STABILIZED COMPASS SYSTEM

Vincent A. Orlando, Melrose, Mass., assignor to General Electric Company, a corporation of New York Application April 26, 1956, Serial No. 580,776

4 Claims. (Cl. 33—222)

This invention relates to direction indicating arrangements and more particularly to gyroscopically stabilized compass systems for dirigible craft.

Under static conditions a simple compass can be one of the most accurate direction indicating arrangements available. However, where compasses are used to indicate directional headings of dirigible craft subject to sudden and rapid changes in heading such as airplanes or ships, movement of the craft and compass may result in violent oscillations of the compass indicator. Although the average position of the oscillating compass indicator is generally quite accurate, still the instantaneous position may vary widely, and it is usually quite difficult to determine directional heading therefrom with any degree of accuracy. Even where a remote compass transmitter utilizing flux valve principles is used to telemeter directional information to a compass receiver, the rotor of the receiver is subject to oscillation with sudden changes in heading of the craft.

Different methods of combining the long-term accuracy of a compass with the short-term stability of a gyroscope have been used in the past to overcome the disadvantages of an oscillating compass detector. According to one proposal, a suspended freely rotatable bar magnet subject to the earth's magnetic field was provided with a damping arrangement controlled by a directional gyroscope. Instead of damping relative movements of the bar magnet with respect to the instrument case which moved in azimuth with the craft carrying the compass, the gyroscope positioned one part of the damping arrangement to damp the bar with respect to the member fixed in azimuth. This proposal was a step forward over simple damped compasses, but it posed certain problems with respect to remotely operated compass systems. In such systems the compass detector is desirably located in a location such as the wing tips or tail of an airplane as far removed as possible from local field disturbances resulting from magnetic materials and electrical wiring. Not only is there little room in such locations for gyroscopic elements, but, especially in the case of electrically driven gyroscopes, the placing of a gyroscope in the vicinity of a compass detector could create the very field disturbances which remote positioning of the compas detector should avoid.

Another proposal to overcome compass oscillation has resulted in slaving a directional gyroscope to a compass. In the usual design, electromagnetic sensing devices produce signals characteristic of the compass and gyro headings and an electronic comparator may produce an error signal to correct the gyro heading to conform to the compass heading. Short term oscillations of the compass thus do not disturb the gyroscope's directional stability. Such systems permit the compass detector to be positioned remotely from the gyroscopic elements and are generally considered satisfactory but they necessarily involve the employment of complicated electronic circuitry with its consequent power requirements and increased chances of failure.

According to this invention, a compass system is provided which partakes of advantages present in each of the previous approaches mentioned above, without many of the disadvantages of previous systems. Thus, a compass system constructed in accordance with this invention, although it employs the stable characteristics of a gyroscope and the advantages of a remotely positioned compass detector, is comparatively inexpensive since it requires no involved electronic circuitry.

Accordingly, this invention has an object to provide a comparatively inexpensive gyroscopically stabilized compass system with remotely positioned compass detector characterized by accurate instantaneous indications not attended by oscillations.

A further object of this invention is to provide a gyroscopically stabilized compass system employing a remotely positioned compass detector without the complicated circuitry usually associated with such devices.

By way of a brief summary of but one aspect of this invention, there is provided an instrument case containing a compass receiver having a rotor connected to an indicator. The compass rotor is urged to predetermined positions determined by signals received from a remote compass transmitter. Within the same case a directional gyro is provided having a major axis gear which moves in azimuth with the gyroscope. Motion damping elements connect the compass receiver rotor to the major axis gear. The motion damper in a preferred embodiment comprises an annular C-shaped magnet fixed with the case; connected to the major axis gear is a soft iron rotor concentric with the annular magnet and ribbed for concentrating the flux from the annular magnet to selected areas on the rotor's periphery. An eddy current cup connected to the compass receiver rotor extends between the magnet and the soft iron rotor. Movement in azimuth of the craft bearing such an instrument will be attended by several consequences. The gyroscope tending to maintain a constant orientation will move in azimuth with respect to the instrument case. Simultaneously, the signal received from the compass transmitter will be varied and the compass receiver rotor will attempt to realign itself in a new orientation. Because of the motion damping connection between the rotor and the gyroscope, the indicator will move smoothly to a new position indicative of the new heading, and oscillations of the indicator are prevented by the motion damping arrangement.

According to this invention no particular attempt is made to stabilize the compass detector by gyroscopic means and the signal received from the detector may, in fact, characterize very large excursions of the bar magnets within the compass detector from their normal alignment with the earth's magnetic field. Instead, it is the rotor of the compass receiver that is damped, thereby permitting the remote and isolated positioning of the compass detector without the necessity of employing complicated and expensive electronic control equipment.

While the scope of this invention is not to be limited, except by a fair interpretation of the appended claims, the details of this invention, as well as further objects and advantages thereof, may perhaps be better understood in connection with the drawings annexed hereto, in which:

Figure 1:
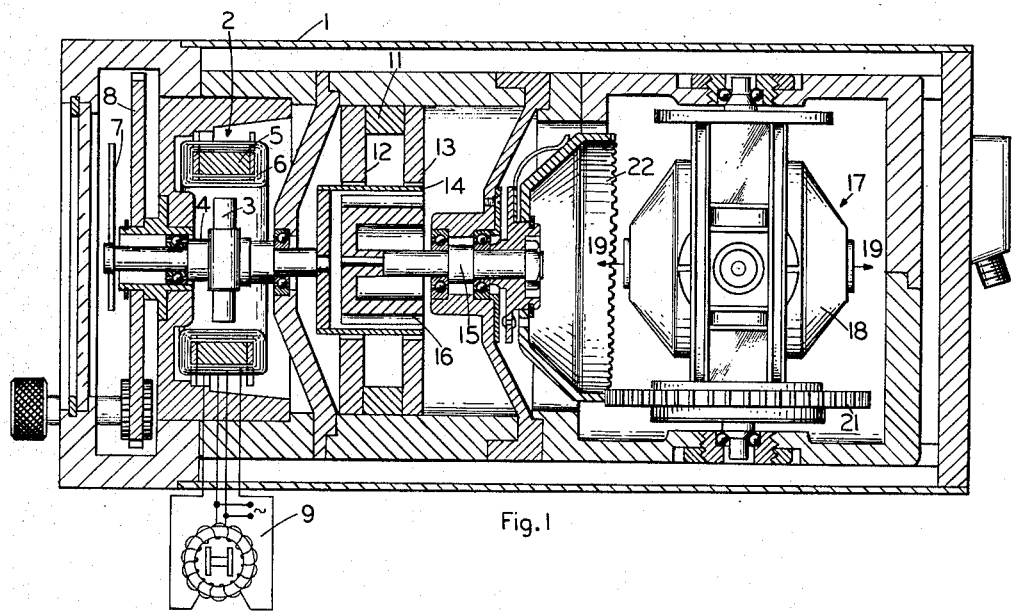
Figure 1 represents a cross-sectional view of an improved gyroscopically stabilized compass constructed in accordance with this invention.

In Figure 1 is shown a gyroscopically stabilized compass system according to this invention in the form of a panel instrument to be mounted in a dirigible craft. In the anterior portion of casing 1 is situated a magnetic compass receiver or repeater 2 comprising a magnetized rotor 3 pivotally mounted on shaft 4. Concentrically surrounding the axis of rotation of rotor 3 is an annular core 5 wound toroidally with a position phase winding 6 in a known manner. This compass receiver is actuated by position phase signals from a remote compass transmitter 9 which generates electrical signals characterizing its orientation in the earth's magnetic field. Although shown as comprising a toroidal core and pivotally suspended bar magnets, compass transmitter 9 may of course be any of several types known in the art. A resultant magnetic field is created across the diameter of the annular core 5 tending to align the rotor 3 along a discrete diameter depending upon the orientation of the compass transmitter and the craft on which it is mounted in the earth's magnetic field. An indicator arrangement, shown in this embodiment as comprising a pointer 7 movable over dial 8, indicates the azimuthal orientation of the craft on which this instrument is mounted. Naturally, other indication arrangements are possible in a device of this character and the movable pointer may be replaced by a movable dial, and pickoff arrangements may be included to operate an autopilot or synchro repeater.

If the compass transmitter 9 is, as shown, of the so-called magnesyn type having suspended bar magnets therein positioned by the earth's magnetic field, it will be obvious that rather large oscillations or excursions of the magnets may result from turns of the craft. If no additional damping of the detector magnets with respect to the craft is provided, the oscillations may be violent, and if such damping is provided, the detector magnets will naturally be dragged off-heading during turns. In either event, the signals received and repeated by the windings 6 will characterize significant excursions of the bar magnets and might ordinarily result in disturbing deviations of the indicator.

It is less obvious, but nevertheless true, that compass detectors of the so-called earth-inductor type would also tend to produce an oscillatory type of error into the indications. Such detectors must be mounted to be sensitive primarily to the horizontal component of the earth's magnetic field, and are therefore pendulously suspended. But during banks, turns, yaws, rolls, and accelerations, a penduously mounted earth's field detector has a tendency to rock or swing and will therefore sense varying horizontal as well as vertical components of the earth's field. Accordingly, the signal transmitter will characterize all such deviations and the compass repeater will have a tendency to oscillate.

Figure 2:
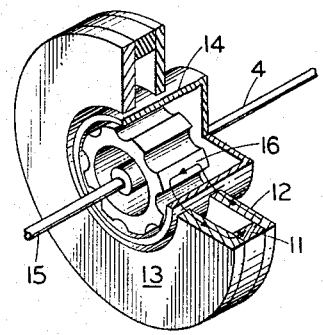
Figure 2 is a pictorial view, partly in section, of the motion damping arrangement shown in Figure 1.

Immediately to the rear of the compass receiver is a motion damping arrangement which in a preferred embodiment comprises an annular magnetized member 11 having flux conducting jaws 12 and 13 connected to opposite ends. This combined member produces a magnetic field in the annular volume of space adjacent the faces of the jaws which is substantially uniform through the 360° of rotation around its central axis. Connected to shaft 4 and arranged to be situated within the magnetic field existing in the annular volume of space is an eddy current cup 14. Within the eddy current cup and mounted on another shaft 15 is a flux concentrating rotor 16 composed of a material such as soft iron and having its surface ribbed to concentrate the fluxes from the surrounding magnetic assembly to selected areas of its surface. The arrows in Figure 2 represent the path of the magnetic flux from magnetized member 11 through flux conducting jaw 12 to a ribbed portion of rotor 16; after crossing lengthwise through the ribbed portion the flux returns again to the magnetized member 11 through flux conducting jaw 13. During its circuit the flux twice crosses through eddy current cup 14.

It can be seen that no direct connection exists between the eddy current cup 14 and the flux concentrating rotor 16 and that both members together are freely rotatable with respect to the casing. However, relative rotation between the eddy current cup and the soft iron rotor will be damped because of the expenditure of energy in producing electrical currents in the cup 14 as a result of the effective movement of magnetic fields through the cup. The cup 14 and rotor 16 are freely rotatable when turning together since there will be no movement of magnetic fields through the conducting material of the cup. It is of course possible that the elements of the preferred motion damping arrangement could be arranged otherwise, for example coaxially instead of concentrically, with the eddy current cup in the form of a disk and the iron rotor in the form of a ribbed plate. The particular motion damping arrangement illustrated in Figures 1 and 2, however, is preferred over other arrangements because of its unusually high damping qualities and because no end pull is exerted between shafts 4 and 15.

In the posterior section of the panel instrument there is shown a gyro mechanism 17 which, in this embodiment, comprises a symmetrical rotor structure 18 such as that described and claimed by Harry C. Wendt in U.S. Patent 2,731,836, issued January 24, 1956, and assigned to the same assignee as that of the present invention. Rotor structure 18 is mounted with its spin axis 19—19 horizontal in the nature of a directional gyro, although, it will be seen, it is unnecessary that the orientation of the gyro spin axis characterize the direction of the craft in azimuth. Because the gyroscope mechanism of this invention is not used to characterize azimuthal orientations of the craft, but merely to stabilize the compass elements which do provide directional reference, no precessing means are required to maintain the orientation of the gyro at any particular compass heading. For this application it is only necessary that the gyro mechanism respond to changes of the craft's azimuthal orientation and a certain amount of drift about the vertical axis is permissible as long as the gyro spin axis is substantially horizontal. It can readily be seen that in this feature alone a considerable weight reduction is involved and the expense of the system has been significantly reduced. Automatic leveling means which may advantageously be employed by the gyro and the necessary electrical connections are omitted since these form no part of the present invention.

With the rotor structure 18 spinning, movement in azimuth of the craft on which this instrument is mounted will be attended by several consequences. Gyroscopic rigidity about the vertical axis will result in rotation with respect to the casing 1 of the major axis gear 21 and the cup gear 22 with which it meshes. Since cup gear 22 is mounted rigidly on shaft 15, movement of the craft in azimuth will also be attended by rotation of rotor 16. Because of the motion damping connection between rotor 16 and cup 14, an immediate realignment of the repeater rotor 3 will result. Simultaneously the character of the signal received by position phase winding 6 will be changed in accordance with the new orientation of the craft and the compass transmitter within the earth's magnetic field. In order to prevent wide deviations of the indicator, the strength of the damping torque exerted by the motion damping arrangement must be sufficient to result in substantially instantaneous realignment of magnetic rotor 3 in accordance with the craft's new heading. At the same time, a slight amount of slippage must be allowed to occur between the damping elements so that slow precessional movements of the rotor structure about its vertical axis will not affect the position of the compass rotor. Without any damping arrangement, movement of the craft would result in an oscillating or hunting movement of the compass rotor; or if the rotor were damped with respect to the case, the compass rotor would tend to lag behind the craft's azimuthal movement and there would be a significant lapse of time before the compass rotor arrived at its new accurate setting. It can be seen that with this novel arrangement, the compass rotor is instantaneously and accurately led to its new position without either time delay or oscillatory movements.

Figure 3:
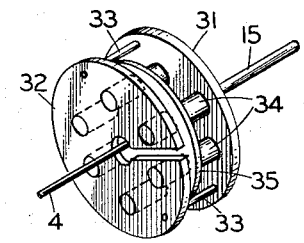
Figure 3 is a pictorial view, partly in section, of an alternate motion damping arrangement.

In the system described, the particular motion damping arrangement illustrated in Figures 1 and 2 possesses certain distinct advantages. Principal among these is the fact that the single most massive portion of the damping arrangement is not mounted on any moving part, but is fixed with respect to the instrument frame. Because a rather large damping torque is required, as pointed out above, the magnetized member 11 and its associated jaws 12 and 13 would preferably be fairly heavy in order to produce a magnetic field of the desired strength. The moving portions of the damping arrangement, on the other hand, may be considerably lighter. The soft iron flux conducting rotor 16 can be hollowed out as shown and need only be large enough to collect and conduct most of the flux emanating from jaws 12 and 13. This considerably reduces the loading on the gyroscope. Eddy current cup 14, the lightest member in the damping arrangement, is preferably affixed to the repeater rotor in order to reduce its inertial resistance to reorientation. Despite the fact that the movable portions of the damping arrangements are comparatively lightweight, a large damping torque results because the concentrated flux must twice pass through the eddy current member.

Where a smaller amount of damping torque is permissible, the tachometer type motion damping arrangement shown in Figure 3 may be used. There two flux conducting plates 31 and 32 supported in spaced apart relationship by posts 33 are mounted on shaft 15. Each plate carries several permanently magnetized elements 34 which create in the center of the arrangement several small magnetic fields. An eddy current disk 35 is carried by shaft 4 to intercept these fields and to have induced therein energy dissipating electrical currents when relative rotation occurs between shafts 4 and 15.

Figure 4:
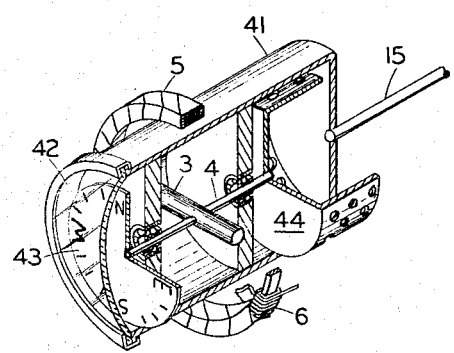
Figure 4 is a pictorial view, partly in section, of still another motion damping arrangement.

Figure 4, wherein like numerals are used to designate parts similar to those shown in Figure 1, illustrates a still further damping arrangement utilizing fluid damping. Thus, shaft 15 supports sealed fluid filled can 41 having a transparent window 42 at one end. Visible through the window may be seen an indicator arrangement 43 supported on shaft 4 with the compass rotor 3. A second fluid damping member 44 within the can is likewise supported on shaft 4 and lends additional resistance to relative rotation between shafts 4 and 15.

Although certain specific embodiments of my invention have been shown and described, it will be apparent that other arrangements are likewise within the scope of these teachings. It is thus obvious that the embodiments shown and described are illustrative and not limiting in nature, and that other changes, substitutions, and additions within the scope and spirit of this invention will occur to those skilled in the art.

What I claim as new and desire to secure by Letters Patent of the United States is:

1. A gyroscopically stabilized compass system for dirigible craft comprising: an instrument case; a first rotary member magnetically urged to assume predetermined orientations with respect to said case in accordance with the azimuthal heading of said craft; a second rotary member; gyroscopic means for causing said second member to rotate in accordance with changes in azimuthal heading of said craft; and motion damping means for damping relative movement between said first and second members comprising means for producing a stationary magnetic field in an annular volume of space within said case, a magnetically permeable rotor in said annular volume having on its surface areas of differing flux collecting power, an electrically conducting eddy current rotor extending into said annular volume between said field producing means and said permeable rotor, means for causing one of said rotors to rotate in accordance with movements of said second member, and means linking movements of the other of said rotors with movements of said first member.

2. A gyroscopically stabilized compass repeater mechanism for dirigible craft comprising: an instrument casing, a universally mounted gyroscope mounted within said casing and having a rotor structure with a normally horizontal spin axis; a rotary element characterizing the azimuthal orientation of said rotor structure with respect to said casing; means for producing within said casing a stationary magnetic field occupying an annular volume of space; a magnetic flux conducting rotary member extending into said annular volume of space and having a configuration such that selected portions of the surface of said member concentrate the flux of said stationary magnetic field; an eddy current member rotatable in the space between said magnetic field producing means and said flux conducting member; a compass receiver mounted in said casing to be actuated by electrical signals characterizing the orientation of said craft in azimuth and comprising a magnetically polarized rotor urged to assume a predetermined orientation with respect to said casing in accordance with the character of said electrical signals; means connecting said rotary element with one of said members for concomitant rotation; means connecting said polarized rotor with the other of said members for concomitant rotation.

3. A gyroscopically stabilized compass system for dirigible craft comprising: a remote compass transmitter for generating electrical signals characteristic of the azimuthal orientation of said craft in the earth's magnetic field; an instrument casing; a compass receiver for receiving said transmitter signals and having a rotor magnetically urged toward various positions in accordance with the character of said signals; a motion damping arrangement comprising a magnetic field producing member fixed with respect to said casing for producing a uniform stationary magnetic field in an annular volume of space within said casing, a magnetically permeable rotor coaxially positioned within said field and having its surface ribbed in an axial direction to define surface areas havng differing flux collecting power, and an electrically conducting eddy current rotor in the form of a circular cylindrical shell extending into the region between said field producing member and said permeable rotor; means linking said compass receiving rotor and said eddy current rotor for concomitant rotation; and gyroscopic means for causing said magnetically permeable rotor to rotate in accordance with a change in azimuthal heading in said craft.

4. A gyroscopically stabilized compass system for dirigible craft comprising: an instrument case, a first rotary member magnetically urged to assume predetermined orientations with respect to said case in accordance with the azimuthal heading of said craft; a second rotary member; gyroscopic means for causing said second member to rotate in accordance with changes in azimuthal heading of said craft; and motion damping means for damping relative movement between said first and second members comprising a magnetic field producing member fixed with respect to said case for producing a uniform stationary magnetic field in an annular volume of space within said case, a magnetically permeable rotor coaxially positioned within said magnetic field and having its surface ribbed in an axial direction to define surface areas having differing flux collecting power, and an electrically conducting eddy current rotor in the form of a circular cylindrical shell extending into the region between said field producing member and said permeable rotor; means for causing said permeable rotor to rotate in accordance with the movements of said second member; and means linking movements of said eddy current rotor with movements of said first member.

References Cited in the file of this patent

UNITED STATES PATENTS

| | | |
|---|---|---|
| 2,242,126 | Holmes et al. | May 13, 1941 |
| 2,247,288 | Delsuc | June 24, 1941 |
| 2,277,027 | West | Mar. 24, 1942 |
| 2,286,406 | Green et al. | June 16, 1942 |
| 2,342,637 | Bechberger | Feb. 29, 1944 |
| 2,446,568 | Wolfe | Aug. 10, 1948 |
| 2,820,303 | Dudenhausen | Jan. 21, 1958 |

FOREIGN PATENTS

| | | |
|---|---|---|
| 600,784 | Germany | July 31, 1934 |